United States Patent [19]

Hirai et al.

[11] Patent Number: 5,074,644
[45] Date of Patent: Dec. 24, 1991

[54] REAR PROJECTION TELEVISION

[75] Inventors: Motoharu Hirai, Tokyo; Katuzi Suzuki, deceased, late of Chiba, by Shizue Suzuki, heir; Toru Yokoo; Hideki Yamamoto, both of Tokyo, all of Japan

[73] Assignee: Pioneer Electronic Corporation, Tokyo, Japan

[21] Appl. No.: 640,783

[22] Filed: Jan. 14, 1991

[30] Foreign Application Priority Data

Sep. 18, 1987 [JP] Japan .................... 62-141714[U]
Oct. 20, 1989 [JP] Japan .................... 1-122254

[51] Int. Cl.$^5$ ............................................ G03B 21/60
[52] U.S. Cl. ...................................... 359/455; 358/247
[58] Field of Search ............... 350/117, 124, 127–129; 358/247, 245

[56] References Cited

U.S. PATENT DOCUMENTS 4,709,272 11/1987 Tischer .......................... 358/247
5,013,132 5/1991 Yokoo et al. .................. 350/128

Primary Examiner—Richard A. Wintercorn
Attorney, Agent, or Firm—Sughrue, Mion, Zinn, Macpeak & Seas

[57] ABSTRACT

A rear-projection television has a transmission type two-layer screen made up of a Fresnel lens and a lenticular lens stacked together. Between the two lenses is interposed a transparent protective sheet which protects the lenses from wear or score, which would otherwise result from rubbing due to vibrations during shipping. The use of a transparent protective sheet sandwiched between the two lenses permits a series of adjustments and a final inspection on the TV to be made with the product screen mounted in the cabinet. This eliminates the need to mount a jig screen identical with the product screen in place of the latter during the adjustments, reducing the overall amount of time spent in the manufacturing process.

3 Claims, 3 Drawing Sheets

FIG. 4

| MATERIAL | PROJECTION LENS AND CRT PROJECTION TUBE FOCUS ADJUSTMENT | CONVERGENCE ADJUSTMENT | WHITE BALANCE ADJUSTMENT | AGING | FINISHING | FINAL INSPECTION | INSPECTION SHIPPING |
|---|---|---|---|---|---|---|---|
| ORIENTED POLYPROPYLENE | R | N | N | — | — | N | — |
| FOAMED POLYETHYLENE | R | R | R | — | — | R | — |

REAR PROJECTION TELEVISION

BACKGROUND OF THE INVENTION

The present invention relates to a so-called rear-projection television, in which images on a CRT projection tube are projected from the rear onto a transmission type two-layer screen through a projection lens.

One example of a conventional rear-projection TV using a transmission type two-layer screen is shown in FIG. 5. In the figure, reference numeral 11 denotes a cabinet containing a projection CRT and a projection lens; 12 a Fresnel lens formed with a plurality of concentric circular grooves; and 13 a lenticular lens formed with a large number of vertical grooves. The Fresnel lens 12 and the lenticular lens 13, stacked together and secured to the cabinet, form the transmission type two-layer screen.

The transmission type two-layer screen is so constructed as to be able to provide easy-to-see images when they are projected onto a large-sized screen from the rear, i.e., from the side of the screen opposite the viewer. The grooves to produce the desired effects of the Fresnel lens and the lenticular lens are formed in the facing surfaces of these lenses.

Rays of light passing through the peripheral portion of the screen, remote from the light axis at the screen center, are converged by the Fresnel lens 12 toward the viewer in front of the screen. The lenticular lens 13 widens the horizontal directional characteristic of the screen so that the brightness will be uniform over the entire lateral range of the screen.

To prevent any color misalignment or Moiré phenomenon effects of the image, the Fresnel lens 12 and the lenticular lens 13 are precisely aligned in position before being installed into the cabinet 11 during manufacture and assembly.

With projection TVs using such a two-layer screen, however, there are some drawbacks. Because TV sets are subjected to vibrations during transport, the grooved surfaces of the contacting Fresnel and lenticular lenses are rubbed against each other to form fine wear particles, which adhere to the inside of the screen staining it. When delivered to the user and set up, the rear-projection TV, though a new product, may produce blurred images with reduced brightness and clarity or color misalignment caused by the fine particles in the screen that disturb the projected rays of light.

SUMMARY OF THE INVENTION

It is therefore an object of this invention to provide a rear-projection television, which has a protective sheet sandwiched between the Fresnel lens and the lenticular lens so as to protect the screen against adverse effects from vibrations during transport. It is also an object of the invention to provide a rear-projection television which is able to undergo a series of adjustments with the product screen mounted to the cabinet, thereby reducing the overall manufacturing time.

To achieve the above objectives, the rear-projection television of this invention comprises: transmission type two-layer screen made up of a Fresnel lens and lenticular lens stacked together; a protective sheet interposed into a gap between the Fresnel lens and the lenticular lens, such a protective sheet being, in one embodiment, transparent; and an opening provided near the edge of the Fresnel lens and the lenticular lens to allow the protective sheet to be pulled out.

Before the television set is used, the protective sheet is pulled out of the double-layer translucent screen so that the Fresnel lens and the lenticular lens function, in combination, as a double-layer translucent screen. The protective sheet held between the Fresnel lens and the lenticular lens prevents these lenses from being rubbed by each other during transportation or during other instances of vibration.

BRIEF DESCRIPTION OF THE DRAWINGS

FIG. 4 is a diagram showing a comparison between two embodiments of the present invention in terms of whether a jig screen needs to be used in each of the adjustment and inspection processes;

DESCRIPTION OF THE PREFERRED EMBODIMENTS

Figure 1:
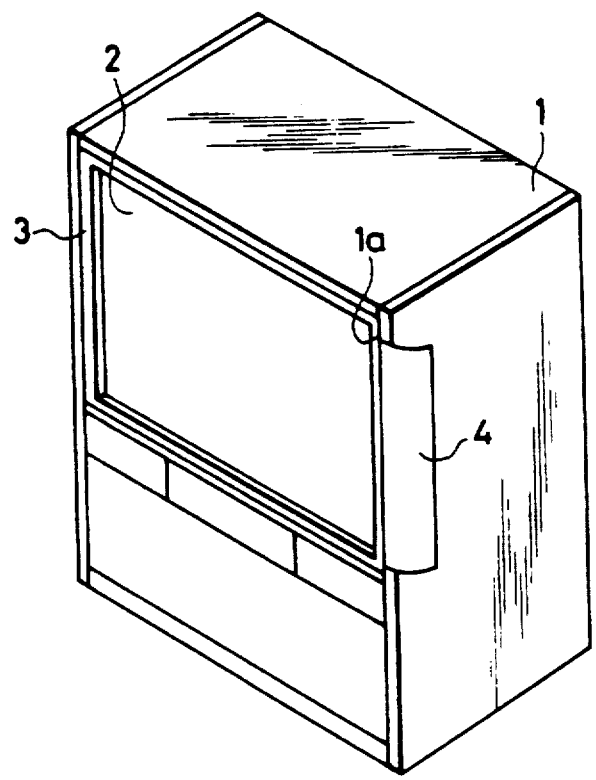
FIG. 1 is a perspective view showing one embodiment of a rear-projection television according to this invention.

FIG. 1 shows a perspective view of a rear-projection television as one embodiment of this invention.

In the figure, reference numeral 1 signifies a cabinet containing a CRT projection tube, a projection lens, an optical reflecting mirror, acoustic speakers, and the like; 2 a transmission type two-layer screen; and 3 a frame to secure the transmission type screen 2 to the cabinet 1.

Denoted 4 is a protective sheet made of a material such as foamed polyethylene or two-axis oriented polypropylene, which is reinforced by being stretched in two orthogonal directions. This protective sheet 4 is put inside the transmission type screen 2 with one end sticking out through an opening 1a, which is formed in one side of the peripheral portion of the cabinet 1 enclosing the frame 3.

Figure 2:
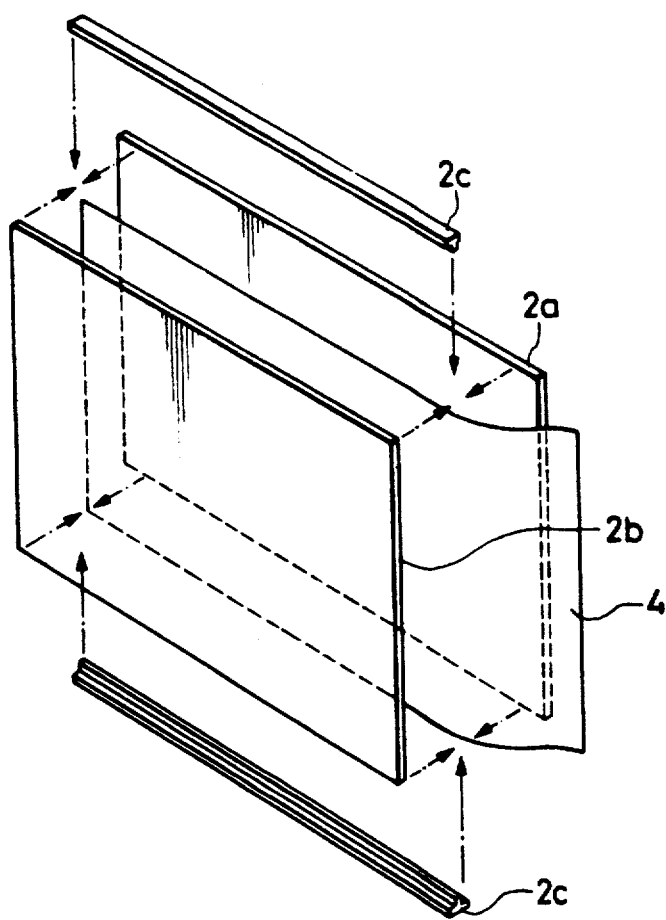
FIG. 2 is a perspective view showing the structure of a transmission type screen of the invention.

FIG. 2 shows the structure of the transmission type screen 2, in which 2a is a Fresnel lens formed with concentric grooves and 2b is a lenticular lens formed with a large number of vertical grooves. Reference characters 2c designate spacers adapted to fix the Fresnel lens 2a and the lenticular lens 2b and to form a gap between the two lenses 2a and 2b.

The Fresnel lens 2a is laid over the lenticular lens 2b. Under this condition, the two lenses are fixedly combined together with the upper and lower spacers 2c. The protective sheet 4 is inserted into the gap formed by the spacers 2c between the Fresnel lens 2a and the lenticular lens 2b with its one end portion drawn out of the one side of the assembly of the two lenses 2a and 2b.

The Fresnel lens 2a and the lenticular lens 2b are, thus, stacked together with the protective sheet 4 interposed therebetween. The two lenses may instead be secured together as by adhesive tape at the upper and lower sides thereof if the spacers 2c are not available. One end of the protective sheet 5 is made to stick out from one side of the Fresnel and lenticular lenses 2a and 2b.

Figure 3:
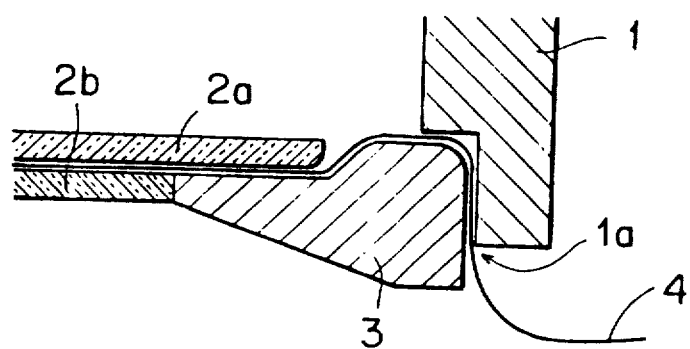
FIG. 3 is a partial cross section showing an opening portion and a protective sheet in the invention.
Figure 5:
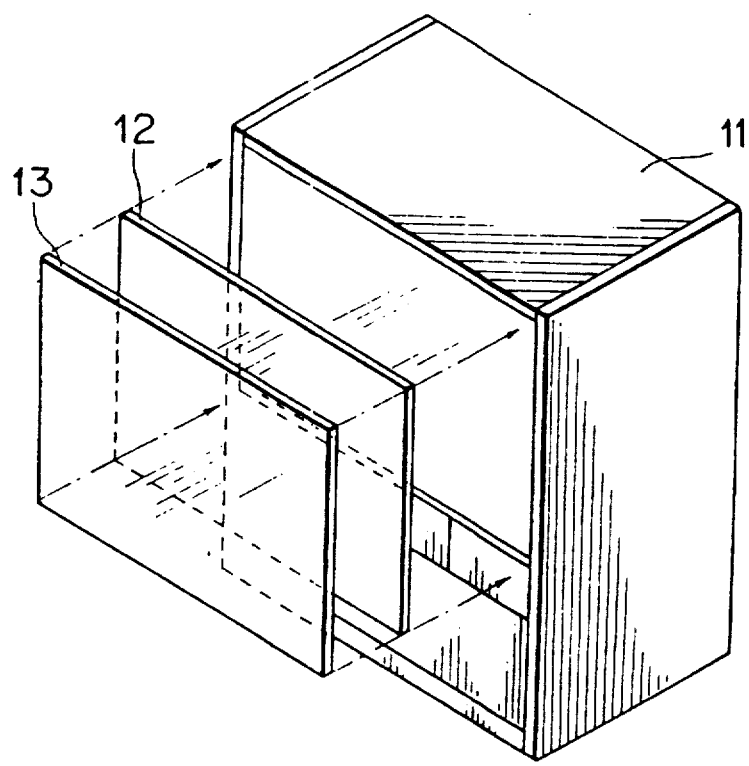
FIG. 5 is a schematic perspective view of a conventional rear-projection TV.

When, as shown in FIG. 1, the frame 3 is mounted in the cabinet 1, the transmission type screen 2 is also fixed to the cabinet 1. As shown in FIG. 3, the opening 1a (or gap) is formed on one side of the frame 3 between the cabinet 1 and the frame 3.

As shown in FIG. 3, the protective sheet 4 placed between the Fresnel lens 2a and the lenticular lens 2b, therefore, can be withdrawn from the frame 3 through the opening 1a, passing the inside of the cabinet 1.

The use of the protective sheet between the Fresnel and lenticular lenses prevents these lenses from rubbing against each other, which would otherwise result from vibrations during shipping.

When the projection TV is used, the end of the protective sheet projecting from one side of the cabinet is pulled out to remove the sheet.

The manufacturing process for the projection TV of this kind includes adjusting and inspection, such as a projection lens focus adjustment, a CRT projection tube focus adjustment, a convergence adjustment, a white balance adjustment and a final inspection. These adjustment processes require a test image to be projected onto the screen.

However, in the projection televisions with the above-mentioned protective sheet of such material as foamed polyethylene inserted in the screen between the Fresnel and lenticular lenses, a jig screen identical to the product screen must be used during the TV adjustment processes because of the opaqueness of the protective sheet, resulting in an increase in the amount of work and time required for the manufacture.

FIG. 4 compares a projection TV of one embodiment of this invention having a transparent two-axis oriented polypropylene sheet and a projection TV of another embodiment of the present invention having a foamed polyethylene sheet, in terms of whether a jig screen has to be used in each of the adjustment and inspection processes during manufacture. The letter "R" in the figure indicates the process requiring a jig screen and "N" indicates the process which does not require a jig screen.

As shown in the figure, the manufacturing process for the projection TV with foamed polyethylene sheets requires the use of jig screen for the projection lens focus adjustment, CRT projection tube focus adjustment, convergence adjustment, white balance adjustment and the final inspection.

In the manufacturing process for the projection TV using the transparent two-axis oriented polypropylene sheet, however, the jig screen is required only for the focus adjustment of the projection lens and the CRT projection tube. During the convergence adjustment, white balance adjustment and final inspection, the transmission type screen 2 secured to the cabinet 1 can be used instead of the jig screen in making adjustments.

While in the above embodiments the two-axis oriented polypropylene film and the foamed polyethylene film are used as protective sheets, it is also possible to use a transparent, flexible sheet of other material that is strong enough so that it will not be broken when pulled out and which is easily bent or folded without scoring the Fresnel and lenticular lenses or the cabinet.

As described above, since the rear-projection television according to this invention has a protective sheet interposed between the Fresnel lens and the lenticular lens, the lenses can be prevented from rubbing against each other, which would otherwise result from vibrations during transport. Moreover, if a transparent protective sheet is used, the transparent protective sheet allows the product screen to be used during adjustment and inspection in the manufacturing process, thus eliminating the need to replace it with the jig screen and reducing the overall manufacturing time.

What is claimed is:

1. A rear projection type television set with a double-layer translucent screen, comprising:
   a Fresnel lens having a grooved surface;
   a lenticular lens having a grooved surface confronting said grooved surface of said Fresnel lens; and
   means for preventing contact between said Fresnel lens and said lenticular lens during vibration of said television set, wherein said means for preventing contact comprises spacer means for maintaining a gap between said lenses and a transparent sheet-like member removably disposed in said gap; and
   means for enabling a user of said television set to remove said transparent sheet-like member without disassembly of said television set, wherein said means for enabling comprises an opening through which said transparent sheet-like member can be pulled out by said user.

2. A rear projection type television set as claimed in claim 1, wherein said transparent sheet-like member is disposed between said Fresnel and said lenticular lenses with a portion of said sheet extending to the exterior of said television set through said opening.

3. A rear-projection type television set as claimed in claim 1, wherein said transparent sheet-like member is a transparent sheet made of two-axis oriented polypropylene.

* * * * *

UNITED STATES PATENT AND TRADEMARK OFFICE
CERTIFICATE OF CORRECTION

PATENT NO. : 5,074,644
DATED : December 24, 1991
INVENTOR(S) : HIRAI, et al.

It is certified that error appears in the above-identified patent and that said Letters Patent is hereby corrected as shown below:

On the Title page, please add :

RELATED U.S. APPLICATION DATA

[63]   Continuation in Part of Ser. No. 07/563,641, Aug. 7, 1990, Patent NO. 5,013,132, and Ser. No. 07/120,446, Nov. 13, 1987, abandoned.

Signed and Sealed this

Thirty-first Day of August, 1993

Attest:

BRUCE LEHMAN

Attesting Officer      Commissioner of Patents and Trademarks